United States Patent Office 3,215,677
Patented Nov. 2, 1965

3,215,677
ONE PART CASTABLE LIQUID THIOL-TERMINATED POLYMER AND METHOD OF CURE

Gene M. Le Fave, Whittier, and Ransome J. Wyman, Riverside, Calif., assignors to Coast Pro-Seal & Mfg. Co., Los Angeles, Calif., a corporation of California
No Drawing. Filed Oct. 16, 1961, Ser. No. 145,431
5 Claims. (Cl. 260—79)

This invention relates to a one part castable liquid polymer and a curing system therefor.

It is an object of this invention to provide a new and useful liquid polymer system which may be cast and cured in place to form an elastomer which is useful as a sealant, coating composition, leather impregnant, repair and coating material in the rubber industry particularly, especially useful as a sealant for fuel tanks in air frames in the aircraft industry, in the electrical industry as caulking and filling compound, and in the missile field as a binder for rocket fuels and solid propellants.

It is a further object of this invention to provide a one part liquid polymer which may be stored for a prolonged period in liquid phase and may be cured in place to a tough, resistant elastomer merely by application to the desired site and associated exposure to the atmosphere.

It is another object of this invention to provide a one part liquid polymer curable to an elastomeric sealant, for example, which eliminates need for mixing ingredients, with consequent elimination of any requirement for mixing equipment.

It is a further object of this invention to provide a one part sealant with its many advantages over multi-part systems, some of which are, for example, simplification of handling; more consistent end products; elimination of incomplete mixing; uniform air-free sealant; minimization of material loss; saving of man hours in clean up time; ready availability of material for use at job sites; elimination of expensive or inaccurate proportioning equipment.

Fundamentally, the present invention is a system for curing a castable liquid polymer, said system being composed of the pre-mixed composition to be cured and a molecular sieve loaded with a chemical which initiates the cure. At the proper time the initiating chemical is expelled from the sieve into contact with the composition to be cured, thereby effecting the cure. Molecular sieves, as used in the present invention, are described in "Chemical Loaded Molecular Sieves" (Form No. F-1311), published by Linde Company, Division of Union Carbide Corporation (1959); in "Chemical Loaded Molecular Sieves in Rubber and Plastic" (Form No. F-1349), published by Linde Company, Division of Union Carbide Corporation (1959); and in Patent 3,036,980, Dunham et al.

More particularly and in a preferred form the expulsion of the initiating chemical is effected by exposing the mixture to atmosphere, so that the adsorption of atmospheric moisture by the sieve expels the initiating chemical therefrom.

Also in a particular preferred form, the composition itself consists of two reactants premixed with an inhibitor, which substantially prevents reaction between the reactants, and with the molecular sieve. In this case, the initiator which is preloaded into the sieve is a neutralizer for the inhibitor, so that when the neutralizer is driven from the sieve, it neutralizes the inhibiting effect of the inhibitor, thereby permitting the two fundamental reactants to react with each other and effect a cure of the polymer.

Specifically and in a preferred form, the molecular sieve is one having an adsorption preference for moisture or water, so that the initiating reactant or neutralizer may be easily expelled into action by mere exposure of the pre-mixed composition to atmosphere.

In a preferred form of the present invention the two fundamental reactants consist of an acceptor and a donor which are prevented from reacting by an acidic inhibitor. The neutralizer loaded into the sieve, upon being driven from the sieve by any suitable means, such as preferential moisture adsorption, neutralizes the inhibitor and permits the reaction of acceptor and donor with consequent cure.

The fundamental reactants are those described in pending application Ser. No. 30,782, filed May 23, 1960, now U.S. Patent 3,138,573, Gene M. Le Fave et al., to which reference is made for a full disclosure of these major reactants. In general, the acceptor is a sulfone activated diethylenic compound. The donor is a branch chain liquid polymer terminated with thiol groups and being polyfunctional with respect to the thiol groups, the functionality being greater than 2 and less than 6. The body of the liquid polymer is composed of repeating units of alkylene groups of 1 to 10 carbons which may, if desired, be substituted with halogen, or arylene groups of 1 to 10 carbons which likewise may, if desired, be substituted with halogen. The groups are connected by linkages of ester, monosulfide, polysulfide, urethane, oxide, or combinations thereof.

From a commercial standpoint the most practical acceptors have been found to be monomeric sulfonyl chemicals having 1 or 2 intermediate sulfonyl radicals each linked to a vinyl group. Among those which are found to be most satisfactory are:

Divinyl sulfone, $CH_2=CHSO_2CH=CH_2$
1,2-bis (vinyl sulfonyl) ethane
$CH_2=CHSO_2CH_2CH_2SO_2CH=CH_2$
1,4-bis (vinyl sulfonyl) butane
$CH_2=CHSO_2CH_2CH_2CH_2CH_2SO_2CH=CH_2$
Bis (vinyl sulfonyl) methane
$CH_2=CHSO_2CH_2SO_2CH=CH_2$
Styryl sulfone, $(C_6H_5CH=CH)_2SO_2$
Alpha-ethyl vinyl sulfone

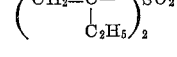

Alpha-n-propyl vinyl sulfone

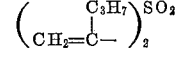

Alpha-phenyl vinyl sulfone

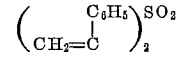

1-butenyl sulfone, $(C_2H_5CH=CH)_2SO_2$
Bis (beta, beta'-vinyl sulfonyl) ethyl ether
$(CH_2=CHSO_2CH_2CH_2)_2O$ Substituted thiophene dioxide

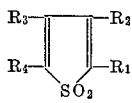

where $R_1$, $R_2$, $R_3$ and $R_4$ may be either a hydrogen, methyl, ethyl phenyl, carbonyl or halogen group.

It has been found that the acceptor compounds listed above may be used in a modified form, i.e., in the form of a prepolymer, to obtain certain advantages, particularly in handling. The modified acceptor may be formed by prereacting the vinyl sulfonyl chemical with the thiol containing donor in a manner so that the ratio $$\frac{\text{vinyl group}}{\text{thiol group}}$$

is about $$\frac{1.5 \text{ to } 2.5}{1}$$

Satisfactory donors, in general, have high molecular weights ranging from 500 to 10,000. They range in viscosity from free flowing liquids to very viscous liquids. They have terminal thiol groups and usually have one or more thiol groups scattered along the molecular chain. Their equivalent weight, or grams per thiol group, as determined by end group analysis, is in the range of 250–5,000.

At present, donors readily available on the commercial market are polysulfide liquid polymers and more particularly the polyalkylene polysulfides known commercially as Thiokol liquid polymers. Such polymers are represented by the general formula:

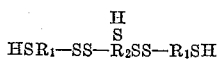

In this formula $R_1$ represents repeating units of bis(ethylene oxy) methane, and $R_2$ indicates propylene segments. These polymers are generally prepared from bis (2-chloroethyl) formal and trichloropropane. The chains are terminated by thiol (SH) groups with thiol groups occurring occasionally along the chain, depending upon the mole percentage of trifunctional monomers used, in the chain of repeating units. Commercially, Thiokol liquid polymers are available from about 500 to about 8,000 molecular weight. At 25 degrees centigrade they have viscosities in excess of 200 centipoise.

Other particularly suitable donors are the thiol terminated derivatives of polyalkylene glycols and especially those glycols listed in said copending patent application and going, for example, under the trade names of Pluracol TP, Tetronic polyols, Polyglycol 112–3 and Niax LHT Triols.

Polyglycol 112–3: A triol derived from glycerine and ethylene and propylene oxides; a viscous liquid having a viscosity at 100 degrees Fahrenheit of 225 cks. It is a trihydroxy polypropylene glycol modified to have primary terminal hydroxyl groups and consequently greater reactivity.

Pluracol TP: A series of polyoxypropylene derivatives of trimethylolpropane. These compounds have three terminal hydroxy groups.

Tetronic polyols: Propylene-ethylene oxide derivatives of ethylene diamine.

Niax LHT: A 1500 molecular weight polyoxyalkylene glycol with three terminal hydroxy groups; a propylene oxide derivative of 1,2,6-hexane triol.

As noted hereinbefore, reaction between acceptor and donor must be inhibited, that is the system must be stabilized, so that it can satisfactorily be stored as a one part sealant. The inhibiting or stabilizing is effected by an acidic compound which may be either an organic acid or an anhydride.

In accordance with the present invention it has been found that this inhibitor is preferably an aliphatic monofunctional acid responding to the formula:

where R is alkyl group of 1 to 18 carbons. Examples of such acids are acetic, propionic, butyric and stearic. The inhibiting acid may also be an aliphatic polyfunctional acid responding to the formula:

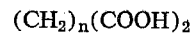

where $n$ is integer from 1 to 10. Examples are malonic, succinic, and adipic acids. Aliphatic polyfunctional acids and anhydrides of 2 to 12 carbons, may also be used, such as maleic anhydride, fumaric acid and tetrahydrophthalic anhydride. It has also been found that aromatic acids and anhydrides of 6 to 16 carbons such as phthalic anhydride, pyromellitic dianhydride and phthalide may be used. In general the organic carboxylic acid or anhydride which may be used may be either aliphatic or aromatic, monofunctional, or polyfunctional as indicated. It may be either an acid or an anhydride. Mineral and Lewis acids are effective but their use at present is not satisfactory because of their corrosive action on the applied substrate.

With the fundamental one part mixture, thus described, is mixed a suitable molecular sieve, which has been loaded with a compound which constitutes a neutralizer for the inhibitor described above. Where the inhibitor is an acid, as in this particular case, the neutralizer is a base.

The base is so loaded into the sieve that intermixture of the sieve with the one part polymer does not initiate a reaction because the base is effectively isolated from the acid by being trapped in the sieve.

To initiate the polymerization, i.e., the reaction between acceptor and donor, it is only necessary to drive the base out of the sieve and into a neutralizing action with the acid. This may be done in a number of ways preferably by simply exposing the total mixture to atmospheric moisture.

In accordance with the present invention the molecular sieves which are used have an extremely high preference for moisture or water. Therefore exposure to the atmosphere even on a very dry day has been found sufficient to drive enough of the base material out of the sieve to neutralize the acid and initiate the cure.

The choice of molecular sieve is very wide, the major requirement being that it have an effective pore diameter equal to or greater than the molecular diameter of the base material loaded into it. That is to say, proper operation of this system requires that the base be actually loaded into the sieve; mere surface wetting of the sieve by the base will not sufficiently isolate the base from the acid to prevent premature cure. Thus, the base must be well loaded into the sieve and this requires a pore diameter at least as large as the molecular diameter of the neutralizing base.

In general molecular sieves are synthetic metal-alumino-silicates having a three dimensional crystal structure. When the water of hydration is driven out by heating to a sufficiently high temperature, the physical structure of the crystals remains unchanged, resulting in a network of empty pores and cavities. Physically, molecular sieves are powders, usually white, with particles ranging from 1 to 3 microns in diameter. Each particle of powder is a single crystal which contains millions of tiny cavities or cages connected by channels of unvarying diameter.

The sieve is preferably preloaded with the base before being mixed into the fundamental reaction mixture. Some such maneuver is in fact essential to insure that the base is at all times isolated from the acid inhibitor until such time as the cure of the polymer is to be initiated.

Suitable bases for use in the present invention are organic nitrogen compounds which are themselves unreactive with the acceptor; which have a basic strength which at least equals sodium acetate; which are thermally stable; which are, preferably, soluble in non-polar solvents; and which have an effective molecular diameter not greater than the pore diameter of the molecular sieve (as noted before). Preferably the base is a tertiary amine such as a trialkyl amine, where the alkyl group has from 1 to 8 carbons, mixed alkyl-aryl amines of the same characteristic, and aliphatic cyclic or heterocyclic amines or diamines having 4–10 carbons.

Specific examples of suitable bases are: trimethyl amine, triethyl amine, triisopropyl amine, N-methylmorpholine, benzyl dimethyl amine, N,N-dimethyl aniline, N,N-diethyl aniline, triethylene diamine, 1,4-dimethyl piperazine, 1,2,4-trimethyl piperazine, tetramethyl guanidine, and $N,N,N^1,N^1$-tetra methyl, 1,3-butanediamine. The fundamentals of the present invention may be expressed symbolically in the following figures:

$$H_2C=CHSO_2\text{ww}R\text{ww}SO_2CH=CH_2 + HS\text{ww}R^1\text{ww}SH$$

liquid prepolymer (+ Residual catalyst)     Polysulfide liquid polymer

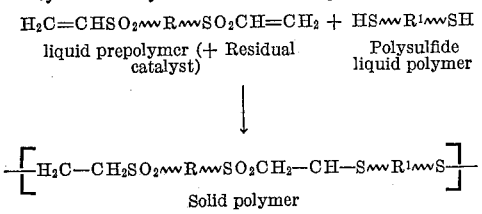

Solid polymer

In the above illustration the prepolymer and polysulfide liquid polymer mixture are unstable and cannot be kept in the same container under normal temperature for any appreciable length of time. This is because the system is sufficiently basic by virtue of the residual catalyst and further polymerization continues.

Polymerization can be effectively inhibited to make a completely stable compound by using a chemical such as pyromellitic dianhydride and others described previously. This effectively neutralizes the residual catalyst and makes the system slightly acidic, to prevent the polymerization reaction. This may be shown schematically as follows:

$$H_2C=CHSO_2\text{ww}R\text{ww}SO_2CH=CH_2 + HS\text{ww}R^1\text{ww}SH$$

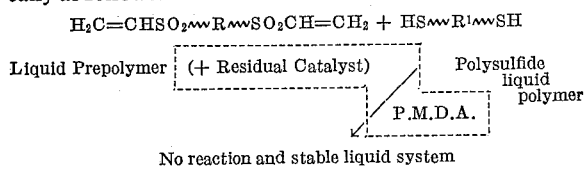

No reaction and stable liquid system

With the mixture charted above, is mixed the molecular sieve loaded with a base which serves as a latent catalyst. Once the base catalyst is loaded into the sieve it is held sufficiently strongly within the structure to isolate it from the environment. The base catalyst remains isolated and confined within the sieve until it is released by heat or by displacement by another chemical to which the molecular sieve has a greater attraction.

As noted before, the molecular sieves from this invention have an extremely high preferential absorption for water, so that even a small amount of moisture in the air is sufficient to drive the base out of the sieve and into neutralizing reaction with the inhibitors. The action of the expelled base is essentially that of a catalyst since it does not become consumed as the polymer cures progressively.

When this system is stored in a sealed container at room temperature, the stability is about 6 months. Upon exposure to atmospheric moisture the amine is released from the molecular sieve by the preferential adsorption and it proceeds to neutralize the acidic stabilizer and catalyze the polymerization reaction by making the total system slightly basic.

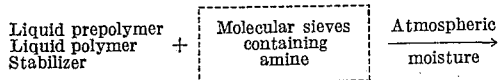

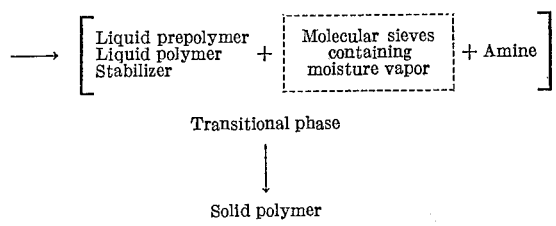

Transitional phase

Solid polymer

The one part system described herein has the following highly significant advantages:

Since only a small amount of base is required to catalyze the curing reaction, only a small amount of moisture is needed to liberate an effective amount of amine. As noted, the liberated amine is a true catalyst. It is not a reactant nor does it become consumed as the polymer cures.

Since molecular sieves have a very high affinity for moisture, the extent of atmospheric humidity is less a factor in the cure of the present system than in prior art systems.

In systems which depend upon deliquescent chemicals for moisture and adsorption, an equilibrium is established between the deliquescent material and the atmospheric moisture. Thus where the atmosphere is extremely dry, as on a hot afternoon, moisture transmission would be in the reverse direction. This is not the case in the present system using the loaded molecular sieves.

Skinning effect of the system as the material cures is not serious. This is because the skin cure which is effected in the present system is not tight, so that small amounts of moisture can continue to penetrate from the atmosphere into the sieve and thus continue the cure. Furthermore, as noted, only a minute release of base material from the sieve is necessary to institute the cure, and once instituted the cure continues steadily, since the base is not used up and once released continues its effect steadily.

Since the curing system is triggered by moisture, it is important, when formulating a compound, to use fillers and additives with a minimum of moisture content. This moisture must be considered in determining the proper amounts of stabilizer and chemical loaded molecular sieve necessary to ensure good curing properties and good package stability. Stability can be aided by pre-drying the raw materials and also by incorporating a dessicant in the formulation. The following formulations illustrate this and the use of a variety of stabilizers and chemically loaded sieves. These formulas include adhesion promoters and thixotropic agents, used where the end product is to be a non-sag sealant or caulking compound. Modifications for other uses are apparent to those familiar to the art.

| | | | | | |
|---|---|---|---|---|---|
| Polysulfide Liquid Polymer [1] | 400 | 400 | 400 | 400 | 400 |
| Liquid Prepolymer [2] | 500 | 500 | 500 | 500 | 500 |
| Inert Fillers | 525 | 525 | 525 | 525 | 525 |
| Thixotropic Agent [3] | 6 | 16 | 16 | 16 | 16 |
| Adhesion Promoter [4] | 25 | 25 | 25 | 25 | 25 |
| Dessicant [5] | 25 | 30 | 30 | 30 | 30 |
| Stabilizer: | | | | | |
|   Pyromellitic Dianhydride | 0.8 | 0.8 | 0.8 | 0.8 | 0.8 |
|   Adipic Acid | | | | | |
|   Maleic Anhydride | | | | | |
|   Phthalic Anhydride | | | | | |
| Curing Agent, Loaded Molecular Sieves: | | | | | |
|   15% Triethylene Diamine | 15 | | | | |
|   15% Triethylamine | | 23 | | | |
|   15% Trimethylamine | | | 15 | | |
|   15% $N,N,N^1,N^1$-Tetramethyl 1,3-Butanediamine | | | | 14 | |
|   15% $N,N,N^1,N^1$-Tetramethyl Ethylene Diamine | | | | | 14 |
|   15% 1,2,4-Trimethylpiperazine | | | | | |
|   15% N-Methylmorpholine | | | | | |

[1] Liquid Polysulfide Resin of 1000 molecular weight, Thiokol LP-33.
[2] A Thiokol LP-3-D.V.S. prepolymer with an equivalent weight, based on unreacted sulfone activated ethylenic groups, of about 800.
[3] Stearic acid, as an example.
[4] Phenolic resin, as an example.
[5] Molecular Sieve powder, Type 5-A, Linde Company, Division of Union Carbide Corp.

| | | | | | |
|---|---|---|---|---|---|
| Polysulfide Liquid Polymer [1] | 400 | 400 | 400 | 400 | 400 |
| Liquid Prepolymer [2] | 500 | 500 | 500 | 500 | 500 |
| Inert Fillers | 525 | 525 | 525 | 525 | 525 |
| Thixotropic Agent [3] | 16 | 16 | 16 | 16 | 16 |
| Adhesion Promoter [4] | 25 | 25 | 25 | 25 | 25 |
| Dessicant [5] | 30 | 30 | 30 | 30 | 30 |
| Stabilizer: | | | | | |
| Pyromellitic Dianhydride | 0.8 | 0.8 | | | |
| Adipic Acid | | | 1.0 | | |
| Maleic Anhydride | | | | 1.0 | |
| Phthalic Anhydride | | | | | 1.0 |
| Curing Agent, Loaded Molecular Sieves: | | | | | |
| 15% Triethylene Diamine | | | 9.0 | 9.0 | 9.0 |
| 15% Triethylamine | | | | | |
| 15% Trimethylamine | | | | | |
| 15% N,N,N¹,N¹-Tetramethyl 1,3-Butanediamine | | | | | |
| 15% N,N,N¹,N¹-Tetramethyl Ethylene Diamine | | | | | |
| 15% 1,2,4-Trimethylpiperazine | 14 | | | | |
| 15% N-Methylmorpholine | | 20 | | | |

[1] Liquid Polysulfide Resin of 1000 molecular weight, Thiokol LP-33.
[2] A Thiokol LP-3-D.V.S. prepolymer with an equivalent weight, based on unreacted sulfone activated ethylenic groups, of about 800.
[3] Stearic acid, as an example.
[4] Phenolic resin, as an example.
[5] Molecular Sieve powder, Type 5-A, Linde Company, Division of Union Carbide Corp. The Thiokols are described in "Polysulfide Polymers (Thiokol), by J. S. Jorczak, contained in the larger work "Introduction to Rubber Technology," by Maurice Martin, at page 378–80, Reinhold Publishing Corporation, New York, 1959. The molecular sieve powder is described in the aforementioned publications of Linde Company.

While the instant invention has been shown and described herein in what are conceived to be the most practical and preferred embodiments, it is recognized that departures may be made therefrom within the scope of the invention, which is therefore not to be limited to the details disclosed herein but is to be afforded the full scope of the claims.

What is claimed is:

1. Process for curing a polymer in place comprising:
   (1) premixing:
      (a) a sulfone activated di-ethylenic compound;
      (b) a branch chain liquid polymer terminated with thiol groups and being poly-functional with respect to the thiol groups, the functionality being greater than two and less than six, the body of said liquid polymer being composed of repeating units selected from the class consisting of alkylene groups of 1 to 10 carbons, arylene groups of 1 to 10 carbons, alkylene groups of 1 to 10 carbons substituted with halogen and arylene groups of 1 to 10 carbons substituted with halogen, said groups being separated by connecting linkages selected from the class consisting of ester, monosulfide, polysulfide, urethane and oxide; said di-ethylenic compound and said polymer being present in a ratio ranging from 0.85 to 1.15 equivalent of di-ethylenic compound to 1 equivalent of polymer;
      (c) an acid which substantially inhibits the curing of said polymer by said di-ethylenic compound and which is selected from the class of organic acids and anhydrides consisting of aliphatic (2–20 carbons), cyclic-aliphatic (4–12 carbons), aromatic (8–12 carbons), and aliphatic-aromatic (7–16 carbons);
      (d) a molecular sieve loaded with a neutralizing base which is capable of neutralizing said acid thereby to enable said curing to proceed; said base being a tertiary amine selected from the group consisting of: trialkyl amines where the repeating unit has from 1 to 8 carbons; mixed alkyl aryl amines where the repeating unit has 1 to 8 carbons; aliphatic-cyclic amines of 4–10 carbons; aliphatic-cyclic diamines of 4–10 carbons, and heterocyclic amines and diamines of 4–10 carbons; said sieve having an effective pore diameter at least as large as the effective molecular diameter of said base;
   (2) expelling said base from said sieve and into neutralizing reaction with said acid; and
   (3) reacting said di-ethylenic compound with said polymer by virtue of the neutralizing of the inhibiting action of said acid, thereby effecting said curing of said polymer by said di-ethylenic compound.

2. Process in accordance with claim 1, wherein said expelling is effected by exposing the mixture to air, with resultant adsorption of atmospheric moisture by said sieve and consequent displacement of said base from said sieve.

3. Process for curing a polymer in place comprising:
   (1) premixing:
      (a) from 0.85 to 1.15 equivalent of di-vinyl sulfone;
      (b) 1 equivalent of a thiol-terminated saturated polyester resin synthetized from polyhydric alcohol and polybasic acid and having an average molecular weight of from 500 to 5,000;
      (c) pyromellitic dianhydride which substantially inhibits the curing of said polymer by said sulfone;
      (d) a molecular sieve loaded with a base consisting of diethylene triamine, which is capable of neutralizing said acid, thereby to enable said curing to proceed;
   (2) expelling said base from said sieve and into neutralizing reaction with said acid; and
   (3) reacting said sulfone with said resin, by virtue of the neutralizing of the inhibiting action of said acid, thereby effecting said cure of said resin by said sulfone.

4. One package polymer composition comprising:
   (a) from 0.85 to 1.15 equivalent of di-vinyl sulfone;
   (b) 1 equivalent of a thiol-terminated saturated polyester resin synthetized from polyhydric alcohol and polybasic acid and having an average molecular weight of from 500 to 5,000;
   (c) pyromellitic dianhydride which is capable of inhibiting the curing action of said sulfone upon said resin; and
   (d) a molecular sieve loaded with a base consisting of diethylene triamine, which is capable, upon explusion from the sieve, of neutralizing the inhibiting action of said acid, thereby permitting said sulfone to enter into curing reaction with said resin; said sieve having an effective pore diameter at least as large as the effective molecular diameter of said base.

5. One package polymer composition comprising a mixture of acceptor, donor, inhibitor, and molecular sieve loaded with neutralizer, said acceptor and donor being present in a ratio ranging from 0.85 to 1.15 equivalents of acceptor to one equivalent of donor, said acceptor comprising a sulfone activated di-ethylenic compound, said donor comprising a branch chain liquid polymer terminated with thiol groups and being poly-functional with respect to the thiol groups, the functionality being greater than 2 and less than 6, the body of said liquid polymer being composed of repeating units selected from the class consisting of alkylene groups of 1 to 10 carbons, arylene groups of 1 to 10 carbons, alkylene groups of 1 to 10 carbons substituted with halogen and arylene groups of 1 to 10 carbons substituted with halogen, said groups being separated by connecting linkages selected from the class consisting of: ester, monosulfide, polysulfide, urethane and oxide; said acid being selected from the class of organic acids and anhydrides consisting of aliphatic (2–20 carbons), cyclic-aliphatic (4–12 carbons) aromatic (8–12 carbons), and aliphatic-aromatic (7–16 carbons); said base being a tertiary amine selected from the class consisting of: trialkyl amines where the repeating unit has from 1 to 8 carbons, mixed alkylaryl amines where the repeating unit has 1 to 8 carbons, aliphatic-cyclic amines of 4–10 carbons, aliphatic-cyclic diamines of 4–10 carbons, and heterocyclic amines and diamines of 4–10 carbons, said sieve having an effective pore diameter at least as large as the effective molecular diameter of said base.

References Cited by the Examiner

UNITED STATES PATENTS

| | | | |
|---|---|---|---|
| 2,257,607 | 9/41 | Jage et al. | 260—79.1 |
| 3,036,980 | 5/62 | Dunham et al. | 260—79.5 |
| 3,138,573 | 6/64 | Le Fave et al. | 260—76 |

OTHER REFERENCES

"Caged Accelerators," C & EN, May 26, 1958, vol. 26, No. 21, pp. 62 and 64.

"Chemically-Loaded Molecular Siever in Rubber Compounding," 83, Rubber Age Paper 482–487, June 1958.

"Chemical Loaded Molecular Sieves" (Form No. F–1311), published by Linde Co., Div. of Union Carbide Corp. (1959).

"Chemical Loaded Molecular Sieves in Rubber and Plastics" (Form No. F–1349), published by Linde Co., Div. of Union Carbide Corp. (1959).

"Chemically-Loaded Molecular Siever in Rubber Compounding," 83, Rubber Age Paper 482–487, June 1958.

LEON J. BERCOVITZ, *Primary Examiner.*